US 9,018,793 B2

(12) United States Patent
Tanahashi et al.

(10) Patent No.: US 9,018,793 B2
(45) Date of Patent: Apr. 28, 2015

(54) ROUTING STRUCTURE OF HIGH-VOLTAGE CABLE IN VEHICLE

(75) Inventors: Hisayuki Tanahashi, Hamamatsu (JP); Masanori Nagayoshi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 573 days.

(21) Appl. No.: 13/402,100

(22) Filed: Feb. 22, 2012

(65) Prior Publication Data

US 2012/0223574 A1    Sep. 6, 2012

(30) Foreign Application Priority Data

Mar. 4, 2011   (JP) .................................. 2011-047888

(51) Int. Cl.
| | |
|---|---|
| *B60L 1/00* | (2006.01) |
| *B60L 3/00* | (2006.01) |
| *H02G 3/00* | (2006.01) |
| *H02G 3/32* | (2006.01) |
| *B60R 16/02* | (2006.01) |

(52) U.S. Cl.
CPC . *H02G 3/32* (2013.01); *H02G 3/00* (2013.01); *B60R 16/0215* (2013.01)

(58) Field of Classification Search
USPC .................................................. 307/9.1, 10.1
See application file for complete search history.

(56) References Cited

U.S. PATENT DOCUMENTS

| | | | |
|---|---|---|---|
| 7,484,581 | B2 | 2/2009 | Yamafuji |
| 2004/0200647 | A1 | 10/2004 | Shingo et al. |
| 2005/0162015 | A1 | 7/2005 | Yamaguchi et al. |
| 2007/0007060 | A1 | 1/2007 | Ono et al. |
| 2009/0120661 | A1 | 5/2009 | Inoue et al. |
| 2012/0112537 | A1* | 5/2012 | Fukazu et al. ............... 307/10.1 |

FOREIGN PATENT DOCUMENTS

| | | |
|---|---|---|
| CN | 100364195 C | 1/2008 |
| CN | 101304901 A | 11/2008 |
| CN | 100566060 C | 12/2009 |
| JP | 2005-125956 A | 5/2005 |
| JP | 2005-218189 A | 8/2005 |
| JP | 2005-262894 A | 9/2005 |
| JP | 2007-014090 A | 1/2007 |
| JP | 2007-015614 A | 1/2007 |

OTHER PUBLICATIONS

Office Action from Japanese Application No. 2011-047888, dated Jul. 24, 2014.
Office Action from Chinese Application No. 201210057227.0, dated Jul. 30, 2014.

* cited by examiner

*Primary Examiner* — Carlos Amaya
(74) *Attorney, Agent, or Firm* — Alston & Bird LLP

(57) ABSTRACT

A routing structure of a high-voltage cable of a vehicle has a high-voltage cable (18) connected to an end surface of a motor (10) and routed along a motor case (13) by being extended from the connecting portion in one direction and then extended in the direction reverse to the one direction, and in which structure a first protector (41) configured to hold the high-voltage cable (18) and extended along the motor case (13) is supported on the motor case (13).

2 Claims, 3 Drawing Sheets

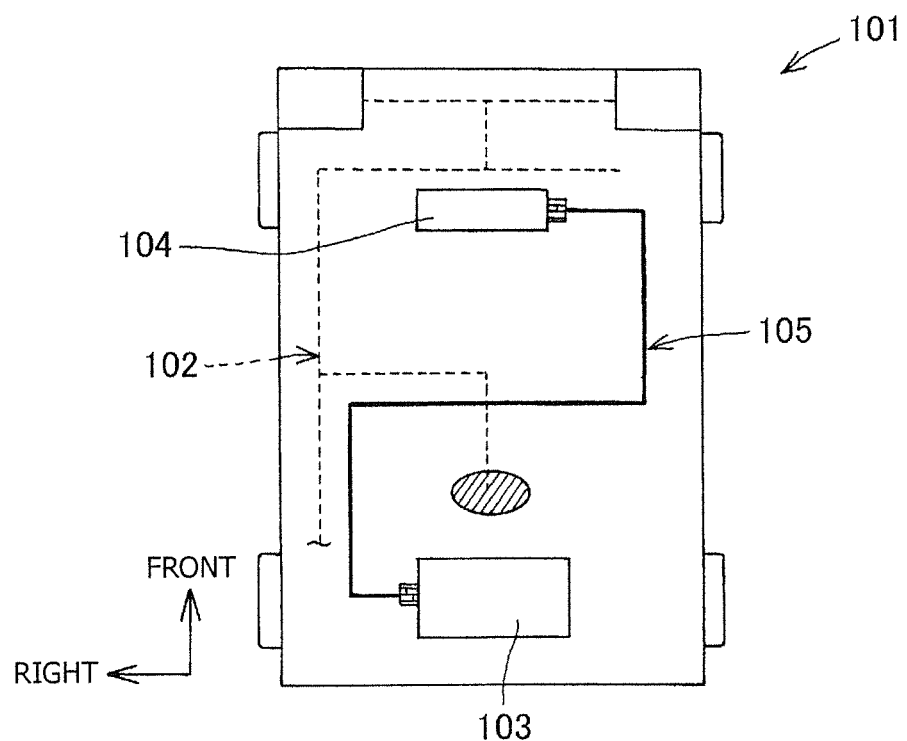

US 9,018,793 B2

ROUTING STRUCTURE OF HIGH-VOLTAGE CABLE IN VEHICLE

CROSS-REFERENCE TO RELATED APPLICATIONS

The present application claims priority to Japanese Patent Application No. 2011-047888, filed Mar. 4, 2011, which is incorporated herein in its entirety.

FIELD OF THE INVENTION

The present invention relates to a routing structure of a high-voltage cable in a vehicle, and more particularly to a routing structure of a high-voltage cable, the routing structure including a layout of a high-voltage cable in an electric vehicle, such as an electric car and a hybrid car.

BACKGROUND OF THE INVENTION

In an electric vehicle, such as an electric car and a hybrid car, a control apparatus and various auxiliary apparatuses, such as lamps and an air conditioner, are configured as a low voltage system (12 V system), and it is necessary to route a low-voltage harness of the low voltage system in which these apparatuses are connected to each other. Furthermore, high-voltage apparatuses such as, for example, a high voltage battery for vehicle propulsion, a motor (dynamotor) for vehicle drive, an inverter, and a converter, are mounted in the vehicle, and it is necessary to route a high voltage cable of the high voltage system in which these high voltage apparatuses are connected to each other. In the apparatuses in the high voltage system, the size of each of the apparatuses is large, and hence, even when these apparatuses are distributed, there are many limitations.

JP2005-262894A relates to a vehicle in which a high voltage unit is fixed to a frame member of the vehicle by a fixing member and in which a high voltage line is fixed to the fixing member. JP2007-14090A relates to a routing structure of a power-wire harness of an electric vehicle, in which structure both end portions of the power-wire harness are respectively made to pass on first and second virtual routing planes so as to be connected to connectors, and in which structure an intermediate portion of the power-wire harness is routed on a third virtual routing plane.

Meanwhile, conventionally, as shown in FIG. 5, in a vehicle 101, a low-voltage harness 102 of a low-voltage system (12 V system) is routed in the vicinity of the center of the vehicle, while as apparatuses of a high-voltage system, a motor 103 that configures a power unit, and an inverter 104 that is a high voltage apparatus for supplying high-voltage power to the motor 103 are dispersedly arranged at mutually separated positions on the vehicle 101. Furthermore, in the vehicle 101, there is a case in which the connecting positions of the high-voltage apparatuses of the high-voltage system with a high-voltage cable 105 are arranged at positions, for example, diagonal positions sandwiching the routing portion of the low-voltage harness 102 of the low-voltage system. Such arrangement may be provided in particular when an apparatus included in one of the low-voltage system and the high-voltage system is commonly used for both the low-voltage and high-voltage systems.

For this reason, when the connecting positions of the high-voltage cable 105 are located at diagonal positions sandwiching the low-voltage harness 102, and when the cable length is reduced, the high-voltage cable 105 connected between the inverter 104 and the motor 103 is arranged to cross the low-voltage harness 102 and in parallel with the low-voltage harness 102.

When the high-voltage cable 105 is arranged to traverse the center of the vehicle body in the left and right direction, the high-voltage cable 105 is inevitably arranged close to the low-voltage harness 102 passing through the floor of the vehicle body, which becomes a cause of noise generation. Furthermore, since the electric power supplied by the high-voltage cable 105 is generally very large, a local increase in internal resistance of the high-voltage cable 105 causes abnormal heating and an increase in power loss, and hence it is necessary to secure a curvature radius of the high-voltage cable 105 so that the curvature radius is not less than a fixed value.

Furthermore, when the high-voltage cable 105 is mounted in the vehicle 101, it is necessary to devise a structure in which the high-voltage cable 105 is compactly routed in the state in which such curvature radius is secured. Furthermore, in the connection structure between the high-voltage cable 105 and the motor 103, the high-voltage cable 105 needs to be routed and supported in consideration of the power unit being moved with respect to the vehicle body and being vibrated.

BRIEF SUMMARY OF THE INVENTION

It is an object of the present invention to provide a routing structure of a high-voltage cable, in which structure the high-voltage cable is compactly routed while the curvature radius required for laying the high-voltage cable is secured, in which structure of the high-voltage cable is held so as to be able to withstand the vibration, and in which structure the high-voltage cable is laid out to provide a measure against the electromagnetic noise due to the high-voltage cable.

In order to achieve the above described object, a routing structure of a high-voltage cable of a vehicle, according to the present invention, is configured by comprising: a power unit including a motor and a transmission that are operationally connected to each other; a high voltage apparatus capable of inputting and outputting high-voltage power; a high-voltage cable for supplying the high-voltage power to the motor; a low voltage apparatus capable of inputting and outputting low-voltage power; and a low-voltage harness for supplying the low-voltage power, and is featured in that the high-voltage cable is connected to an end surface of the motor and is routed along the motor case of the motor by being extended from the connecting portion in one direction and then extended in the direction reverse to the one direction, and in that a first protector configured to hold the high-voltage cable and extended along the motor case is supported on the motor case.

In the routing structure of a high-voltage cable of a vehicle, according to the present invention, the high-voltage cable can be compactly routed in the state in which the curvature radius required for laying the high-voltage cable is secured. Also, the high-voltage cable can be held to withstand the vibration, and further can be laid out to provide a measure against the electromagnetic noise due to the high-voltage cable.

BRIEF DESCRIPTION OF THE DRAWINGS

FIG. 5 is a schematic bottom view of a conventional routing structure of a high-voltage cable of a vehicle.

DETAILED DESCRIPTION OF THE INVENTION

An object of the present invention is to provide a routing structure of a high-voltage cable of a vehicle, in which structure a high-voltage cable is compactly routed while a curvature radius required for laying the high-voltage cable is secured, in which structure the high-voltage cable is held to be able to withstand the vibration, and in which structure the high-voltage cable is laid out to provide a measure against the electromagnetic noise due to the high-voltage cable. This object is realized in such a manner that the high-voltage cable is connected to an end surface of a motor and is routed along the motor case of the motor by being extended from the connecting portion in one direction and then extended in the direction reverse to the one direction, and that a first protector configured to hold the high-voltage cable and extended along the motor case is supported on the motor case.

FIG. 1 to FIG. 4 show an embodiment according to the present invention.

Figure 1:
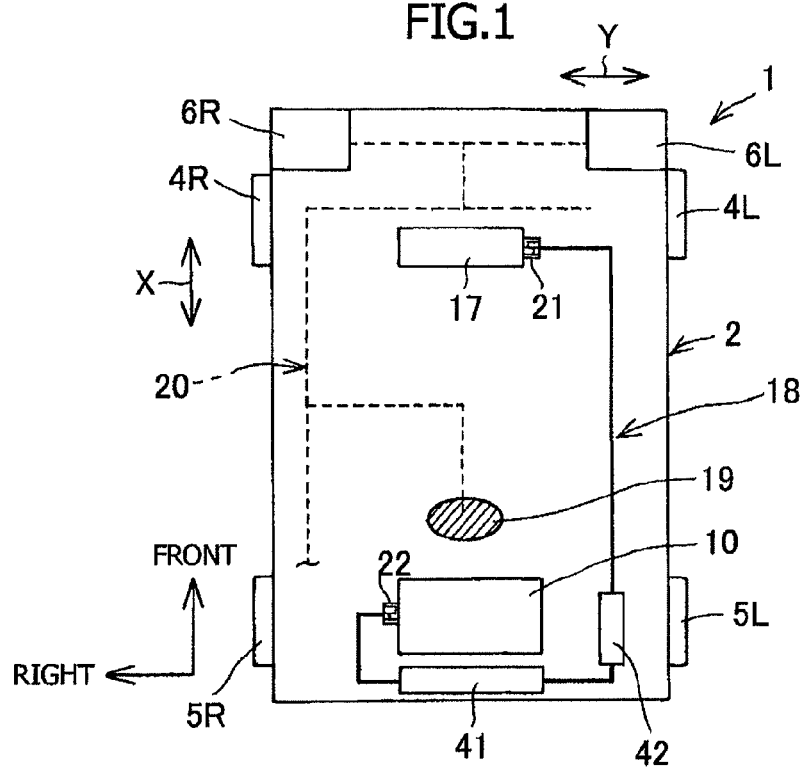
FIG. 1 is a schematic bottom view of a routing structure of a high-voltage cable of a vehicle, according to an embodiment of the present invention.

In FIG. 1, reference numeral 1 denotes a vehicle, such as a hybrid vehicle, and reference numeral 2 denotes a vehicle body. Furthermore, reference characters 3L and 3R respectively denote a left side member and a right side member, which configure the vehicle body 2, and reference characters 4L and 4R respectively denote a front left wheel and a front right wheel. Reference characters 5L and 5R respectively denote a rear left wheel and a rear right wheel, and reference characters 6L and 6R respectively denote a left headlight and a right headlight.

Figure 2:
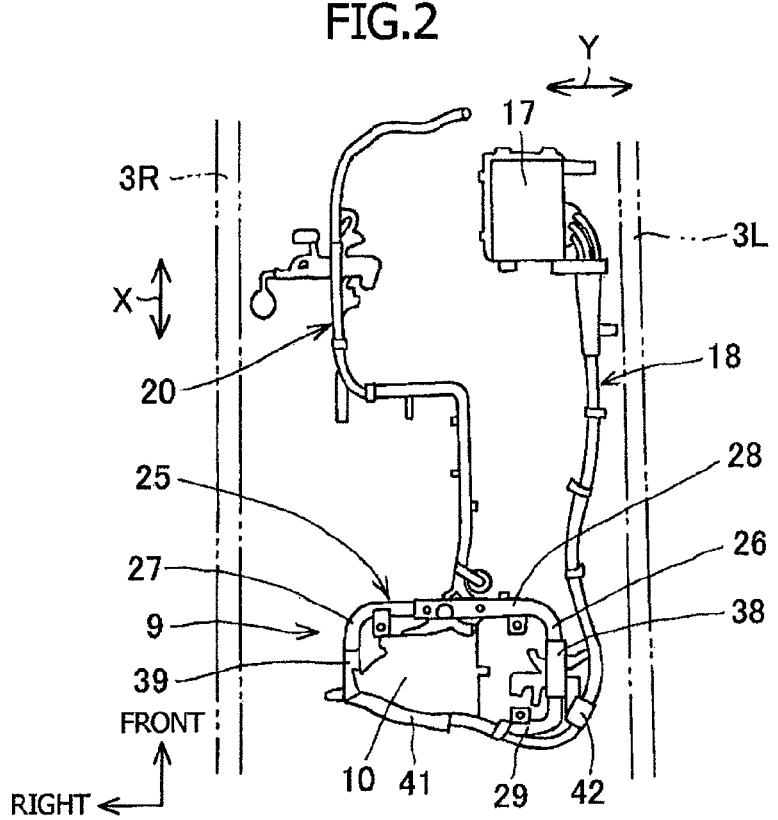
FIG. 2 is a bottom view showing a layout of the high-voltage cable and a low-voltage harness according to the embodiment of the present invention.
Figure 3:
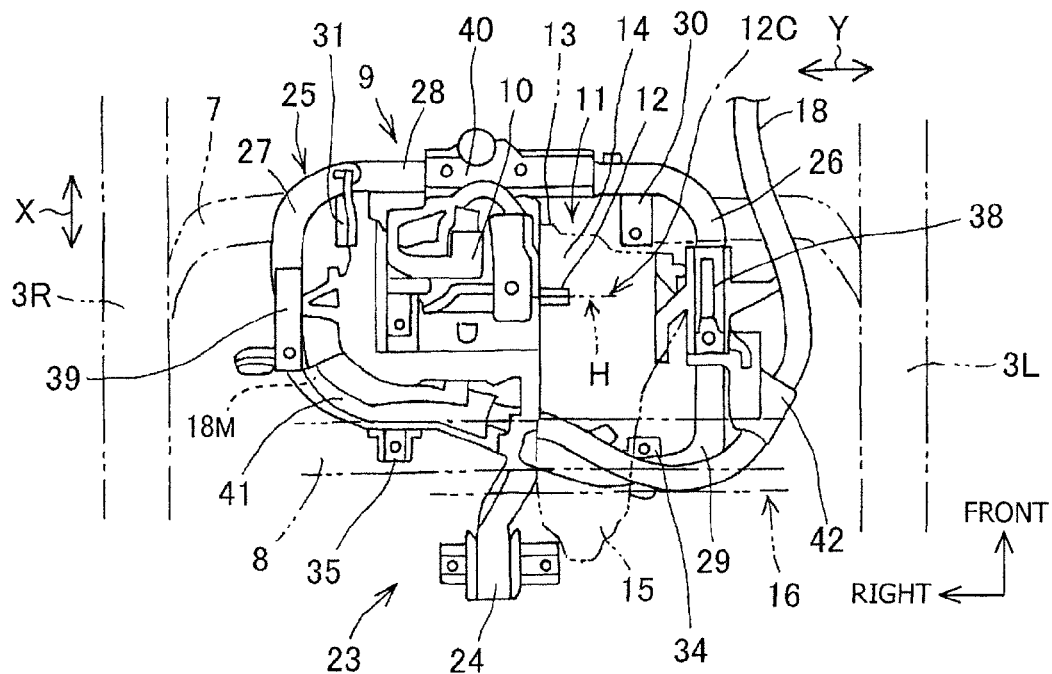
FIG. 3 is an enlarged bottom view showing the layout of the first protector and the second protector in FIG. 2.

As shown in FIG. 2 and FIG. 3, the left side member 3L and the right side member 3R are arranged so as to be linearly extended along the vehicle front-rear direction X. In a rear portion of the vehicle, each of the left side member 3L and the right side member 3R is formed by a front portion which is provided on the front side in the vehicle front-rear direction X and extended substantially in the horizontal direction, a rising portion which rises from the rear end of the front portion to the rear upper side, and a rear portion which is extended from the rear end of the rising portion to the rear side substantially in the horizontal direction.

Furthermore, the connecting portion between the front portion and the rising portion of the left side member 3L is connected to the connecting portion between the front portion and the rising portion of the right side member 3R by a front cross member 7 extended in the vehicle width direction Y (see FIG. 3). The front side portion of the rear portion of the left side member 3L is connected to the front side portion of the rear portion of the right side member 3R by a rear cross member 8 extended in the vehicle width direction Y (see FIG. 3). The intermediate portion of the rear portion of the left side member 3L is connected to the intermediate portion of the rear portion of the right side member 3R by a suspension cross member extended in the vehicle width direction Y. Furthermore, the rear end of the rear portion of the left side member 3L is connected to the rear end of the rear portion of the right side member 3 by a rear panel extended in the vehicle width direction Y. At the upper portion of the left and right front portions, a front floor (front side floor of the rear floor of the vehicle) is provided. At the upper portion of the left and right rising portions, a vertical wall portion connected to the front floor is provided. At the upper portion of the left and right rear portions, a rear floor (rear side floor of the rear floor of the vehicle) connected to the vertical wall portion is provided. Thereby, the rear floor is connected to the front floor via the vertical wall portion.

As shown in FIG. 2 and FIG. 3, a power unit 9 is mounted in the vehicle 1. The power unit 9 includes a motor 10 and a transmission 11 which are operationally connected to each other. The motor 10 includes a rotary shaft 12 and a motor case 13, and the axial center 12C of the rotary shaft 12 is directed in the vehicle width direction Y.

The transmission 11, which is mainly a speed reducing mechanism, includes a transmission mechanism 14 connected to the motor 10, and a deferential mechanism 15 provided on the rear side of the transmission mechanism 14, and is connected to the left side portion of the motor 10 in the vehicle width direction Y. The differential mechanism 15 includes an output shaft 16 (left and right axles) and is arranged on the rear side of the transmission mechanism 14 and under the rear cross member 8 provided along the lower surface side of the rear floor. The rear left wheel 5L and the rear right wheel 5R are attached to the outer ends of the output shaft 16, respectively.

As shown in FIG. 1 and FIG. 2, an inverter 17 which is a high voltage apparatus capable of inputting and outputting high-voltage power, and a high-voltage cable 18 for supplying high-voltage power to the motor 10 are mounted in the vehicle 1. Also, a low voltage apparatus (12 V system) 19 capable of inputting and outputting low-voltage power, and a low-voltage harness 20 for supplying low-voltage power are mounted in the vehicle 1. The motor 10 is arranged on the rear side of the vehicle 1. The inverter 17 is arranged on the front side of the vehicle 1.

The motor 10 and the inverter 17 are respectively mounted dispersedly at mutually separated positions on the vehicle 1, and are connected to each other by the high-voltage cable 18.

The high-voltage cable 18 is extended from the inverter side connecting portion 21 of the inverter 17 mounted on the front side of the vehicle 1. Furthermore, the high-voltage cable 18 is laid and fixed onto the floor surface so as to be horizontally extended along the left side member 3L as one of the side members and along the floor surface at an inner position of the left side member 3L, and is connected to a motor side connecting portion 22 provided at the right end surface of the motor 10.

As shown in FIG. 2, the high-voltage cable 18 as a whole is routed substantially in a J-shape in a bottom view. The curved portion of the path of the high-voltage cable 18 routed substantially in a J-shape is formed in the periphery of the power unit 9 provided in the vehicle rear portion, so as to meander with respect to the J-shape as the reference path. Furthermore, the high-voltage cable 18 is connected to the motor side connecting portion 22 provided on the right end surface of the motor 10, and is routed along the motor case 13 by being extended from the connecting portion in one direction and then extended in the direction reverse to the one direction.

The low voltage apparatus 19, which is arranged in the periphery of the power unit 9, is arranged substantially at the center in the vehicle width direction Y and on the vehicle front side of the motor 10, and is connected to the low-voltage harness 20. The low-voltage harness 20 is connected to each of the apparatuses, such as the left headlight 6L and the right headlight 6R.

As shown in FIG. 3, a rear mounting mechanism 24, which configures a part of a power unit mounting structure 23 for supporting the mounting of the power unit 9 to regulate the rolling movement of the power unit 9, is arranged at a rear portion of the transmission 11 of the power unit 9. The rear mounting mechanism 24 is connected to the vehicle body 2.

A sub-frame 25 is mounted on the vehicle 1 so as to be located under the front floor and the rear floor that is connected to the front floor via the vertical wall portion. The sub-frame 25, to which the power unit 9 is mounted, is formed into an annular shape by joining together each of its left and right side portions and its front and rear side portions, and is attached in the vicinity of a step-shaped rise portion (rear half portion) of the rear floor by using the height difference of the rise portion.

Figure 4:
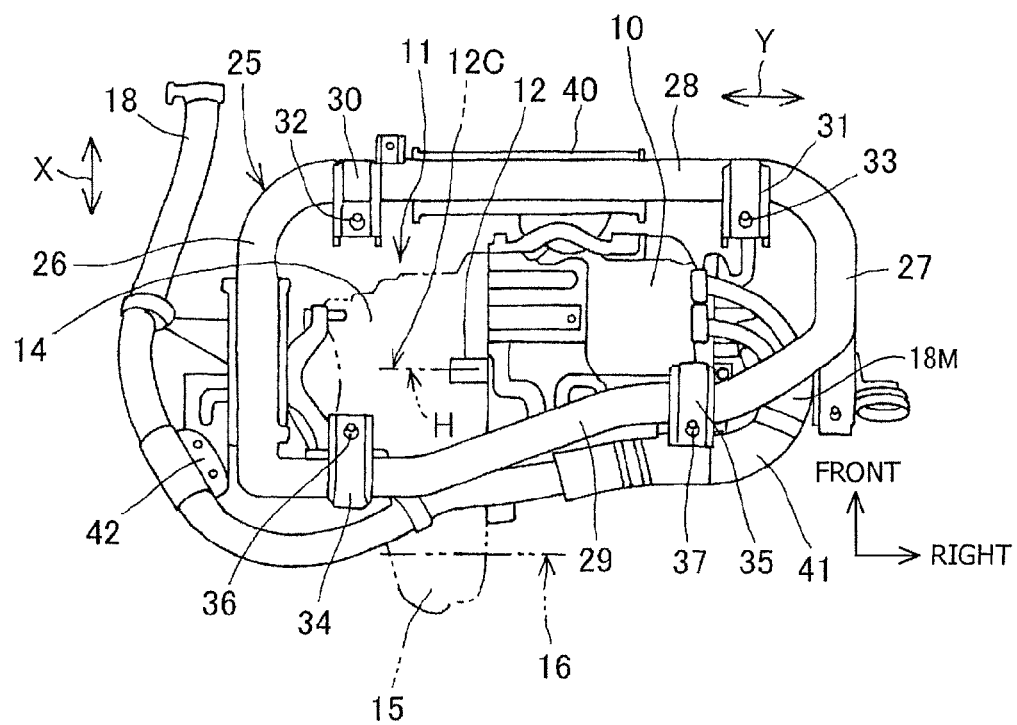
FIG. 4 is a plan view showing the layout of each of the protectors shown in FIG. 3.

As shown in FIG. 3 and FIG. 4, the sub-frame 25 is configured by a pair of left and right side cross frame portions 26 and 27 extended in the vehicle front-rear direction X, and by a pair of front and rear cross frame portions 28 and 29 extended between the pair of left and right side cross frames 26 and 27 horizontally in the vehicle width direction Y, and is formed by a pipe material in an annular shape.

Each of the left and right side cross frame portions 26 and 27 is extended in the vehicle front-rear direction X, and is bent in a C-shape so that its rear end is positioned on the upper side. For this reason, the annular sub-frame 25 exhibits a three-dimensional annular shape.

Each of the front and rear cross frame portions 28 and 29 is arranged along the power unit 9 so as to be extended in the vehicle width direction Y. Furthermore, the high-voltage cable 18 is extended along the rear cross frame portion 29.

A front left mounting bracket 30 and a front right mounting bracket 31 are provided on the front cross frame portion 28 of the sub-frame 25 respectively on the side of the transmission 11 and on the side of the motor 10 in the vehicle width direction Y.

The front left mounting bracket 30 and the front right mounting bracket 31 are respectively provided with a front left mounting bolt 32 and a front right mounting bolt 33, and are connected to the front cross member 7 provided at the front floor and the connecting portion of the vertical wall portion.

Furthermore, a rear left mounting bracket 34 and a rear right mounting bracket 35 are provided at the rear cross frame portion 29 of the sub-frame 25 respectively on the side of the transmission 11 and on the side of the motor 10 in the vehicle width direction Y.

The rear left mounting bracket 34 and the rear right mounting bracket 35 are respectively provided with a rear left mounting bolt 36 and a rear right mounting bolt 37, and are connected to the rear cross member 8 extended in the vehicle width direction Y.

In order to allow the other portions of the power unit mounting structure 23 to be configured, the sub-frame 25 is provided with: a left mounting mechanism 38 which is attached to the left side cross frame portion 26 so that the axis direction of the left mounting mechanism 38 is directed in the vehicle front-rear direction X; a right mounting mechanism 39 which is attached to the right side cross frame portion 27 so that the axis direction of the right mounting mechanism 39 is directed in the vehicle front-rear direction X; and a front mounting mechanism 40 which is attached to the front cross frame portion 28 so that the axis direction of the front mounting mechanism 40 is directed in the vehicle width direction Y.

As shown in FIG. 3, both side ends of the power unit 9 are respectively mounted and supported on the left side cross frame portion 26 and the right side cross frame portion 27 via the left mounting mechanism 38 and the right mounting mechanism 39. That is, the power unit 9 is supported by connecting the left end portion of the transmission 11 in the vehicle width direction Y to the shaft portion of the left mounting mechanism 38, and by connecting the right end portion of the motor 10 in the vehicle width direction Y to the shaft portion of the right mounting mechanism 39.

In the power unit mounting structure 23, the sub-frame 25 is formed into an annular shape with a pipe material, and thereby the rigidity of the sub-frame 25 is improved to reduce vibration transmitted from the front cross frame portion 28 and the rear cross frame portion 29 to the vehicle body 2.

In the left mounting mechanism 38 and the right mounting mechanism 39, each having a structure in which a shaft of the mounting mechanism is supported in an outer cylinder via vibration absorbing rubber, each of the outer cylinders is attached to each of the left side cross frame portion 26 and the right side cross frame portion 27 in the state in which the axis center of the shaft is directed in the vehicle width direction.

Furthermore, the left mounting mechanism 38 and the right mounting mechanism 39 are arranged respectively on the left side cross frame portion 26 and the right side cross frame portion 27 so that the positions of the mounting mechanisms in the vehicle front-rear direction and in the vehicle vertical direction approach a horizontal line H that passes through the center of gravity of the power unit 9 and extends in the vehicle width direction Y. The horizontal line H substantially coincides with the axial center 12C of the rotary shaft 12 of the motor 10.

A battery for auxiliary apparatuses is arranged above the transmission 11 of the power unit 9 that is supported on the sub-frame 25 by each of the mounting mechanisms 38, 39 and 40. Furthermore, a battery unit of the high-voltage system for driving the motor 10 is arranged in front of the front cross frame portion 28 of the sub-frame 25.

As shown in FIG. 3 and FIG. 4, in the sub-frame 25, the rear left mounting bracket 34 arranged on the side of the differential mechanism 15 is made to project from the rear cross frame portion 29 to the vehicle front side, and the rear right mounting bracket 35 arranged on the side of the motor 10 is made to project from the rear cross frame portion 29 to the vehicle rear side.

Thereby, in the power unit mounting structure 23, the projecting directions of the two rear left and right mounting brackets 34 and 35 with respect to the rear cross frame portion 29 are made different from each other, so that deformation can be suppressed and vibration transmitted from the sub-frame 25 to the vehicle body 2 can be reduced.

Note that in the power unit mounting structure 23, a tire support member is provided in a space on the rear side of the rear cross frame portion 29, and is arranged so that a spare tire can be mounted in the state in which the tire is inclined to the vehicle rear lower side. Furthermore, a part of the rear cross frame portion 29, which part is located on the side of the motor 10, is made to curve to the vehicle front side along the outer peripheral shape of the spare tire, so that a spare tire having a larger outer diameter can be mounted on the rear side of the rear cross frame portion 29.

As shown in FIG. 1 to FIG. 4, a first protector 41 which supports the high-voltage cable 18 and which is extended along the motor case 13 is supported on the motor case 13. The first protector 41 is supported on the motor case 13 so that the position, at which the arrangement direction of the high-voltage cable 18 is reversed, is located in the vicinity of the right mounting mechanism 39.

Furthermore, a second protector 42 for supporting the high-voltage cable 18 is provided on the sub-frame 25. The second protector 42 is fixed to the left side cross frame portion 26.

As shown in FIG. 3 and FIG. 4, the rotary shaft 12 of the motor 10, and the output shaft 16 of the differential mechanism 15 are provided side by side so as to be separated from each other in the vehicle front-rear direction X. Furthermore, the first protector 41 supported on the motor case 13 is provided within a space having the front-rear direction width between the rotary shaft 12 of the motor 10 and the output shaft 16 of the transmission 11.

As shown in FIG. 1, the low-voltage apparatus provided to be arranged in the periphery of the power unit 9, and the low-voltage harness 20 connected to the low voltage apparatus 19 are arranged on the vehicle right side which is the opposite side across the power unit 9 with respect to the high-voltage cable 18 and the second protector 42 that supports the high-voltage cable 18.

The high-voltage cable 18 is extended along the motor case 13, and is then extended and supported on the vehicle body 2 by being separated from the low-voltage apparatus 19 and the low-voltage harness 20 by a predetermined distance. Furthermore, the low-voltage harness 20 is routed in the direction away from the power unit 9.

As shown in FIG. 2, the high-voltage cable 18 is made to pass between the right side cross frame portion 27 of the sub-frame 25, and the right side member 3R, and is routed along the rear cross frame portion 29 in such a manner that the high-voltage cable 18 is extended around the sub-frame 25 from the rear side of the sub-frame 25 while the position of the high-voltage cable 18 is gradually raised to the upper side.

The high-voltage cable 18, which is routed along the right side cross frame portion 27 and the rear cross frame portion 29, is supported on the sub-frame 25 while crossing the sub-frame 25, and is supported by the rear left mounting bracket 34 and the rear right mounting bracket 35 which are provided as a plurality of mounting brackets for supporting the high-voltage cable 18. Also, the high-voltage cable 18 is supported by the first protector 41 and the second protector 42 which are provided as a plurality protectors for protecting the high-voltage cable 18.

Specifically, immediately after the high-voltage cable 18 is pulled out from the upper front position on the left end surface of the motor 10, the high-voltage cable 18 is curved in an arc shape, and is routed in the periphery of the motor case 13 and along the outer surface of the motor case 13.

For this reason, the first protector 41 that protects the high-voltage cable 18 is provided in the periphery of the motor case 13 and along the outer surface of the motor case 13. The high-voltage cable 18 is mounted in a comparatively compact manner so that the high-voltage cable 18 is routed only in the periphery of the motor case 13 in the state in which the curvature radius of the curved portion 18M of the high-voltage cable 18 is secured.

Furthermore, the first protector 41 supported on the motor case 13 is provided so that the curved portion 18M, at which the arrangement direction of the high-voltage cable 18 is reversed, is located in the vicinity of the right mounting mechanism 39 of the power unit 9. The position of the first protector 41 is also a position in the vicinity of the left mounting mechanism 38 and the right mounting mechanism 39 which are located on the horizontal line H passing through the center of gravity of the power unit 9. At this position, the relative positional change between the vehicle body 2 and the power unit 9 is smallest, and vibration energy is also small.

Furthermore, the rear cross frame portion 29 is located higher than the upper surface of the motor case 13, and the high-voltage cable 18 and the first protector 41 are routed under the rear cross frame portion 29 and along the rear cross frame portion 29, so as to be mounted within the space corresponding to the external shape of the sub-frame 25.

The high-voltage cable 18 is extended around the rear side of the rising portion of the left side cross frame portion 26 of the sub-frame 25, while crossing the left side cross frame portion 26. The second protector 42 supported on the left side cross frame portion 26 is provided at this position. The rear left mounting bracket 34 and the rear right mounting bracket 35 are respectively provided at positions slightly separated from the position of the second protector 42 in the direction along the high-voltage cable 18, so as to be supported on the sub-frame 25. Thereby, the high-voltage cable 18 can be made to appropriately meander to eliminate local stress concentration, and the like, and can be suitably routed.

In this way, the position of the high-voltage cable 18 is smoothly shifted from a horizontal height position facing the floor surface to the fixing position on the sub-frame 25. Then, while the height of the high-voltage cable 18 is increased, the high-voltage cable 18 is curved in a compact manner, and is extended around the power unit 9, so as to be connected to the opposite end portion.

Furthermore, the high-voltage cable 18 arranged along the outer surface of the motor case 13, the first protector 41, and the rear cross frame portion 29 are mounted within the space having the front-rear width between the axial center 12C of the rotary shaft 12 of the motor 10 and the center (axle center) of the output shaft 16 of the differential mechanism 15 of the transmission 11. In this arrangement, even when a movement eccentric to these shaft centers is caused in the power unit 9, the amount of movement of the high-voltage cable 18 is suppressed to be small.

By the above-described routing layout of the high-voltage cable 18 as a whole, the interference between the low-voltage harness 20 and the high-voltage cable 18 can be avoided even when the low-voltage harness 20 and the electrical components of the low-voltage system are installed at the vehicle center (portion corresponding to the front floor).

In the above, the embodiment according to the present invention has been described. The configuration of the above-described embodiment is described in association with the appended claims.

First, in a first aspect of the present invention, the high-voltage cable 18 is connected to the end surface of the motor 10 and is routed along the motor case 13 by being extended from the connecting portion in one direction and then extended in the direction reverse to the one direction, and the first protector 41, which supports the high-voltage cable 18 and which is extended along the motor case 13, is supported on the motor case 13.

Thereby, the high-voltage cable 18 can be compactly routed along the motor case 13 in the state in which the curvature radius of the high-voltage cable 18 is secured. Furthermore, by the compact routing, it is possible to suppress the influence of the high-voltage cable 18, such as the influence of the generation of electromagnetic noise, on the peripheral apparatuses arranged at positions separated from the high-voltage cable 18 by a small distance.

In a second aspect of the present invention, the sub-frame 25 is provided which supports the power unit 9 via the mounting mechanisms 38, 39 and 40, and which includes at least a rear cross frame portion 29 extended along the power unit 9. Furthermore, the high-voltage cable 18 is extended along the rear cross frame portion 29, and the second protector 42 for supporting the high-voltage cable 18 is provided, so as to be supported on the sub-frame 25.

Thereby, in the state in which the load applied to the high-voltage cable 18 supported on the vehicle body 2 via the sub-frame 25 is reduced, the high-voltage cable 18 can be connected to the motor 10 while being compactly mounted on the side of connection with the motor 10. Furthermore, the high-voltage cable 18 can be supported while being protected by the protectors 41 and 42, and the rear cross frame portion 29.

In a third aspect of the present invention, both side ends of the power unit 9 are respectively supported on the sub-frame 25 via the mounting mechanisms 38 and 39, and the first protector 41 is supported on the motor case 13 so that the position, at which the extending direction of the high-voltage cable 18 is changed from one direction to the reverse direction, is located in the vicinity of the mounting mechanism 38.

Thereby, in the connection structure in which the high-voltage cable 18 is connected to the power unit 9 that is moved relative to the vehicle body 2 and vibrated, the load applied to the high-voltage cable 18 due to the movement and vibration can be reduced.

In a fourth aspect of the present invention, the rotary shaft 12 of the motor 10, and the output shaft 16 of the transmission 11 are provided side by side so as to be separated from each other in the vehicle front-rear direction, and the first protector 41 supported on the motor case 13 is provided within the space having the front-rear width between the rotary shaft 12 of the motor 10 and the output shaft 16 of the transmission 11.

Thereby, in the connection structure in which the high-voltage cable 18 is connected to the power unit 9 that is moved relative to the vehicle body 2 and vibrated, it is possible to reduce the load applied to the high-voltage cable 18 particularly due to the eccentric movement and vibration of the power unit 9.

In a fifth aspect of the present invention, the low voltage apparatus 19 provided to be arranged in the periphery of the power unit 9, and the low-voltage harness 20 connected to the low voltage apparatus 19 are arranged at the opposite side across the power unit 9 with respect to the high-voltage cable 18 and the second protector 42 supporting the high-voltage cable 18, and the low-voltage harness 20 is routed in the direction away from the power unit 9. Furthermore, after the high-voltage cable 18 is extended along the motor case 13, the high-voltage cable 18 is extended to be separated from the low-voltage apparatuses 19 and the low-voltage harness 20 by a predetermined distance, and is supported on the vehicle body.

Thereby, the influence of electromagnetic noise on the low-voltage harness 20 due to the high-voltage cable 18 can be suppressed.

The routing structure of a high-voltage cable according to the present invention can be applied to various electric vehicles.

What is claimed is:

1. A routing structure of a high-voltage cable of a vehicle, the routing structure comprising: a power unit including a motor and a transmission that are operationally connected to each other; a rotary shaft of the motor and a output shaft of the transmission that are provided side by side so as to be separated from each other in the vehicle front-rear direction; a high voltage apparatus capable of inputting and outputting high-voltage power; a high-voltage cable for supplying the high-voltage power to the motor; a low voltage apparatus capable of inputting and outputting low-voltage power; and a low-voltage harness for supplying the low-voltage power, wherein the routing structure further comprising a sub-frame which supports each side end of the power unit via a mounting mechanism and includes at least a cross frame portion extended along the power unit;

wherein the high-voltage cable is connected to an end surface of the motor and is routed along a case of the motor by being extended from the connecting portion in one direction and then extended in the direction reverse to the one direction and is supported by a first protector that is extended along the motor case and supported on the motor case so that the position at which the extending direction of the high-voltage cable is changed from the one direction to the reverse direction is located in the vicinity of the mounting mechanism;

wherein the high-voltage cable is supported by a second protector which is extended along the cross frame portion and is supported on the sub-frame; and wherein the first protector is arranged within a space having the front-rear width between the rotary shaft of the motor and the output shaft of the transmission.

2. The routing structure of a high-voltage cable of a vehicle according to claim 1, wherein the low voltage apparatus arranged in the periphery of the power unit and the low-voltage harness connected to the low voltage apparatus are arranged at the opposite side across the power unit with respect to the high-voltage cable and the second protector supporting the high-voltage cable, wherein the low-voltage harness is routed in the direction away from the power unit, and wherein, after the high-voltage cable is extended along the motor case, the high-voltage cable is extended to be separated from the low-voltage apparatuses and the low-voltage harness by a predetermined distance, and is supported on the vehicle body.

* * * * *